May 26, 1964  P. G. PRIAROGGIA ETAL  3,134,149
EXTRUSION OF METAL SHEATHS FOR ELECTRIC CABLES
Filed March 31, 1961
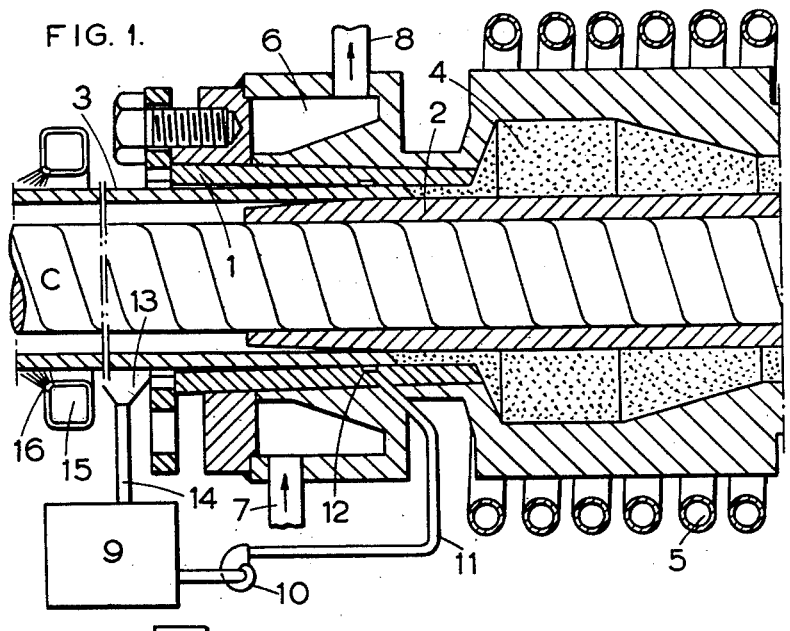
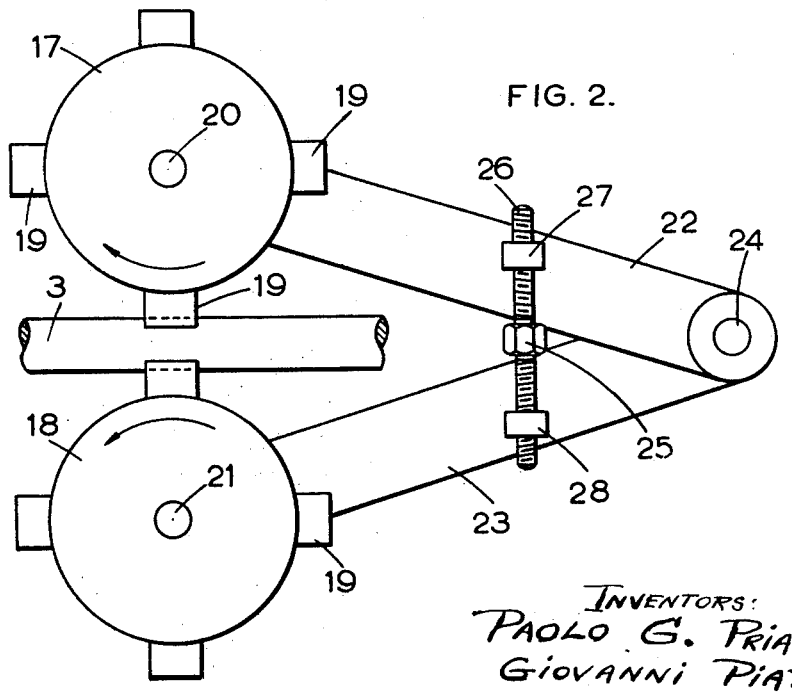
INVENTORS:
PAOLO G. PRIAROGGIA
GIOVANNI PIATTI
by Eugene E. Stevens
ATTORNEY

United States Patent Office 3,134,149
Patented May 26, 1964

3,134,149
EXTRUSION OF METAL SHEATHS FOR
ELECTRIC CABLES
Paolo Gazzana Priaroggia, Milan, and Giovanni Piatti,
Crescentino, Vercelli, Italy, assignors to Pirelli Societa
per Azioni, Milan, Italy
Filed Mar. 31, 1961, Ser. No. 99,825
21 Claims. (Cl. 22—57.2)

The present invention relates to the formation, around an electric cable, of a sheath of metal, especially, though not necessarily exclusively, of aluminium, by an extrusion process.

In the extrusion of cable sheaths, it is necessary both for reasons of economic production and of reliability of the cable in cases wherein the insulation is constituted by paper, rubber or plastics, to carry out the extrusion at the highest possible speed. This is generally restricted by the impossibility of increasing the cooling beyond a certain limit and also by the friction of the aluminium, or other metal intended to form the sheath, against the walls of the extrusion nozzle.

The present invention has for its object a method and the relative apparatus which will enable the speed of extrusion of the sheath on to the cable to be increased beyond the limits permitted by the methods and the means known heretofore.

According to the invention, in the formation around an electric cable of an extruded sheath from molten metal, the said molten metal is supplied to an extrusion nozzle under atmospheric pressure and, to a length of sheath already extruded, there is applied an intermittent tractive force in an axial direction away from the extrusion nozzle whereby movement of the said extruded length and the extrusion of a further length of sheath are carried out in a series of steps, a powerful cooling operation being applied in the neighbourhood of the extrusion nozzle whereby solidification therein of the molten metal to at least a heavy paste state on to the rear end of the sheath is effected during the periods of stoppage in the travel of the sheath. Successively, the sheath so applied is stretched and drawn down on to the cable by passage through a die and/or a series of rolls.

The cooling effect required to secure the above action of complete or heavy, paste-form solidification is supplied by cooling fluid circulated around the extrusion nozzle and if need be, cooling fluid is sprayed on to the sheath after its emergence from the nozzle to effect complete solidification or hardening of the newly formed molten metal-provided portion of the sheath. The cooling effect and also the movement through the nozzle of the metal being extruded may be promoted by the injection between the said metal and an operative surface of the extrusion nozzle, of a molten alloy having a melting point lower than that of the extruded metal. The alloy having this cooling and lubricating effect may, for example, be Pb—Bi—Cd, Pb—Bi—Sn or Pb—Bi—Cd—Sn.

The present invention permits the obtaining, inter alia, of the following main advantages:

A smoother and more regular surface of the sheath, greater crystalline orientation and, therefore, better mechanical characteristics of the material of the sheath, both as regards breaking load and ultimate elongation.

By means of the invention, sheaths of excellent qualities from the point of view both of mechanical and of metallographic characteristics, with an outer diameter of between 2 and 10 cm. and a thickness of from 0.5 to 6 mm., have been obtained by applying to said sheaths intermittent tensile force of frequencies between 60 and 500 strokes per minute, with longitudinal movements, at each stroke, of an amplitude between 1 and 30 mm. Of course, these values are merely an indication and do not restrict the present invention, since they may be considerably modified by varying the design of, and the means for cooling, the nozzle.

In order that the invention may be clearly understood and readily carried into effect, it will now be described more fully with reference to the accompanying drawing, wherein:

FIGURE 1 illustrates, in longitudinal section, one form of extrusion nozzle with its associated cooling means in accordance with the invention, and FIGURE 2 shows an example of apparatus for applying intermittent tractive force to the extruded sheath.

Referring to FIGURE 1, 1 indicates the ring member of an extrusion nozzle and 2 the bored central core thereof for the passage of a cable C to be covered with an extruded sheath 3.

The molten aluminium enters, solely under the action of gravity and at atmospheric pressure, into a chamber 4 in the extrusion apparatus, being maintained in the molten state by a heater 5. The molten metal, which penetrates between the ring 1 and the core 2, is subjected to powerful cooling in the zone towards the orifice of the extrusion nozzle by means of a cooling fluid supplied to a chamber 6 surrounding the nozzle through the pipe 7 and issuing therefrom by a pipe 8. The cooling zone provided by annular chamber 6 at least partially solidifies or hardens the surrounded metal (4) to such a heavy pasty state that it will couple onto the rear end of the previously formed sheath portion 3 during periods of sheath movement stoppage as hereinbefore mentioned.

In order to obtain an increase in the cooling effect for the transformation of the aluminium from the molten to the solid state in that portion of the nozzle near the extrusion orifice and to assist at the same time the sliding of the solidified aluminium through the ring member 1 without excessive friction, a molten alloy of low melting point as compared with that of the extruding metal, for example of the type indicated above, is injected between the extruded metal while it is solidifying and the inner surface of the ring 1. Such alloy is maintained in a molten state in a reservoir 9, from which it is drawn by a pump 10 and supplied, by means of a pipe 11, into an annular duct 12 formed in the inner surface of the ring member 1. On issuing from the extrusion nozzle, the alloy of low melting point, which is still in the liquid state and which runs between the inner surface of the ring 1 and the sheath 3, is collected in a funnel 13 and returned by a pipe 14 to the reservoir 9, where it may be reheated ready for repetition of the cycle.

Extrusion is initiated by introducing a metal tube into the ring 1 and causing the molten aluminium to flow at the same time into the nozzle while cooling of the terminal portion thereof is carried out so as to produce solidification of the aluminium on to the end of the metal tube. At this point extrusion proper of the sheath is initiated by applying to the tube in the axial direction tractive impulses of predetermined frequency and amplitude.

Immediately down stream, that is in front, of the extrusion nozzle, the metal sheath 3 is further cooled, if need be, by means of water or other fluid sprayed on to it by a spraying ring 15 provided with holes 16. The sheath is then subjected first to the action of the device exerting intermittent tractive force and finally to that of reducing apparatus constituted by a die or drawplate and/or by a series of rolls adapted to stretch the sheath longitudinally and reduce it in diameter so as to clamp it on to the cable, and impart to it mechanical properties which normally result from a cold-working operation.

Apparatus for producing the above intermittent tractive force in the axial direction which is illustrated in FIGURE 2 comprises two drums 17 and 18 rotated in opposite directions, as indicated by the arrows, the extrusion apparatus (not shown) being regarded as to the right of the figure. Each of these drums is provided on its periphery with one or more projections 19 made of hard rubber or other material having similar characteristics, the said projections, on emergence of the sheath 3 from the extrusion apparatus, gripping it in pairs in succession, so causing it to advance each time by a predetermined distance with a corresponding extrusion action. The amplitude and the frequency of the intermittent movements may be altered by varying respectively the length in the rotational direction of the projections 19 and the speed of the drums 17 and 18 or the number of the projections. The two drums 17 and 18 are carried by spindles 20, 21 mounted on arms 22, 23 which are pivoted to one another at 24. These arms may be spread apart to a greater or less extent by operating a nut 25 fixed on a screw spindle 26 provided along its opposite ends with right- and left-handed threads respectively engaging nuts 27, 28 pivoted in the arms 22, 23, so as to enable the distance between the axes of the drums 17 and 18 to be proportioned to the dimensions of the extruded sheath 3.

What we claim and desire to secure by Letters Patent of the United States is:

1. A method of forming around an electric cable an extruded sheath from molten metal, including the steps of supplying the said molten metal under atmospheric pressure to an extrusion nozzle surrounding said cable, injecting between the molten metal in said nozzle and an operative surface of said nozzle, a molten alloy having a melting point lower than that of said molten metal, cooling said metal within said nozzle by causing it to remain stationary therein for a predetermined period while simultaneously applying a cooling medium to said nozzle so as to form a length of at least partially solidified and hardened extruded sheath, and moving said length out of said nozzle with admission to said nozzle of a further supply of molten metal.

2. A method as in claim 1, according to which said solidified metal as formed into said length of extruded sheath is metallically joined to a similar length of sheath previously extruded and to said previously extruded length of sheath there is periodically applied an intermittent tractive force in an axial direction away from said extrusion nozzle.

3. Apparatus for forming around an electric cable an extruded sheath from molten metal, comprising in combination a chamber for the metal to be extruded, heating means associated with said chamber, an extrusion nozzle consisting of a ring member and a bored core member concentric with, and of an external diameter less than, the internal diameter of said ring member whereby an annular space is left between said ring and core members, said space being in communication with said chamber, cooling means in proximity to said extrusion nozzle, members shaped and disposed to bear on the external surface of a sheath as it is extruded from said nozzle, means for causing the bearing of the said shaped members with pressure on the sheath during predetermined intermittent equispaced periods, means for moving the said shaped members, together with the sheath, a predetermined distance axially away from said extrusion nozzle during each of said periods and means for releasing said shaped members from their bearing on the sheath on expiry of each of said periods.

4. Apparatus as in claim 3, wherein one of said members of which said extrusion nozzle consists is formed, in the surface with which the metal to be extruded makes contact, with an annular duct, said apparatus also including a source of molten alloy at a temperature lower than that of the metal to be extruded and means for supplying said molten alloy from said source to said duct.

5. Apparatus as in claim 4, including means for collecting the molten alloy as it is discharged from said extrusion nozzle and for returning it to a receptacle, and means which, if necessary after reheating, it is re-circulated to said annular duct.

6. The method of forming a continuous metal sheath as an extension of a previously formed metal sheath portion which is spaced around an electric cable that extends through an extrusion nozzle, the previously formed sheath portion having at least its rear end disposed within the nozzle rearwardly of the outlet of the latter, said method comprising—

(a) supplying molten metal at atmospheric pressure to the nozzle and circumferentially spacing same about the cable and against the rear end of said sheath portion to provide a molten rear extension of the latter with the nozzle;

(b) periodically moving said sheath portion forwardly in the direction of the nozzle outlet to project succeeding sheath portions beyond the nozzle outlet and with the molten-metal provided sheath extension following the rear sheath portion end in intimate engagement therewith;

(c) cooling at least a predetermined forwardmost length of said molten metal-provided nozzle-housed sheath extension to a temperature below its melting point, at each interval between forward sheath movements, whereby said forwardmost extension lengths successively become functionally and at least partially solidified and hardened integral parts of said sheath portion.

7. The method as specified in claim 6, but wherein the said respective nozzle extension lengths are successively cooled to a temperature at which they solidify within the nozzle during related intervals between forward sheath movement.

8. The method set forth in claim 6, but wherein the previously formed metal sheath portion initially protrudes from the nozzle outlet, and wherein said periodic sheath movement is effected by a nozzle-adjacent tractive force applied to successive finished sheath portions after same have passed from said nozzle outlet.

9. The method as set forth in claim 6, but wherein the molten metal-provided sheath lengths are only partially solidified and hardened within the nozzle, and wherein sheath portions issuing from the nozzle are subjected to the action of a final cooling medium to fully solidify and harden same.

10. The method as set forth in claim 6 but wherein the molten metal-provided sheath lengths are only partially solidified and hardened within the nozzle, and wherein sheath portions issuing from the nozzle are subjected to the action of a final cooling medium to fully solidify and harden same and wherein the previously formed metal sheath portion initially protrudes from the nozzle outlet, and wherein said periodic sheath movement is effected by a nozzle-adjacent tractive force applied to successive finished sheath portions after same have passed from said nozzle outlet.

11. The method as set forth in claim 10, and which includes the step of injecting between the molten sheath-providing metal and an operative surface of the nozzle, a molten anti-friction providing metal alloy having a melting point lower than that of said sheath-providing metal, and withdrawing said still molten metal alloy from the nozzle adjacent the nozzle outlet.

12. The method as set forth in claim 6, and which includes the step of injecting between the molten sheath-providing metal and an operative surface of the nozzle, a molten anti-friction providing metal alloy having a melting point lower than that of said sheath-providing metal, and withdrawing said still molten metal alloy from the nozzle adjacent the nozzle outlet.

13. A method of forming around an electric cable an extruded sheath from molten metal, including the steps of supplying the said molten metal under atmospheric pressure to an extrusion nozzle surrounding said cable, intermittently effecting movement of said molten metal toward the nozzle outlet, injecting between the molten sheath metal in said nozzle and an operative surface of said nozzle, a molten anti-friction-providing alloy having a melting point lower than that of said molten sheath metal, cooling the nozzle outlet-adjacent-sheath metal within said nozzle while it is stationary therein for a predetermined period by applying a cooling medium to said nozzle so as to form a length of extruded sheath while maintaining the alloy molten, and moving said sheath length out of said nozzle with admission to said nozzle of a further supply of molten metal while withdrawing molten alloy from adjacent the nozzle outlet.

14. Apparatus for forming around an electric cable an extruded sheath from molten metal, comprising in combination a chamber for the metal to be extruded, heating means associated with said chamber, an extrusion nozzle having an outlet end and comprising a ring member and a longitudinally bored cable-guiding core member concentric with said ring member, said core member being of an external diameter less than the internal diameter of said ring member and having a portion surrounded by the latter, whereby an annular metal-receiving space is left between opposed metal-contacting surfaces of said ring and core members; said space being in communication with said metal supply chamber, cooling means in proximity to said extrusion nozzle inwardly of the outlet end thereof, spacedly opposeable sheath-actuating members located at opposite sides of and beyond the nozzle outlet end, mounting means for said sheath-actuating members, drive means operatively connected to said actuating members and incorporated in said mounting means, said drive and mounting means periodically bringing said actuating members into time-limited substantially simultaneous actuating engagement with the sheath, and said drive means operating during said periods of actuating member and sheath engagement to move both actuating members and sheath axially away from said nozzle outlet.

15. The apparatus of claim 14 and said sheath-actuating means comprising the periodically opposed ends of arms, said combined mounting and drive means for said sheath-actuating arms comprising separate shafts fixedly carrying said arms and rotatably driven in opposite directions.

16. The apparatus of claim 15 and levers having end portions supporting said shafts, pivot means connecting the other lever end portions for lever movement away from the nozzle in opposite directions, manually operable lever-carried means between the shafts and said lever-connecting pivot for maintaining the shafts different distances apart according to different diameters of sheaths being extruded.

17. The apparatus of claim 14 and wherein there are two cooling means in proximity to said nozzle, namely—
(a) a cooling medium-receiving chamber surrounding the ring member; and
(b) a cooling medium-receiving means discharging against the extruded sheath outwardly of the discharge end of the nozzle.

18. The apparatus of claim 14, and wherein one of the opposed molten metal-contacting surfaces of one of said ring and core members has an annular duct therein, a source of molten alloy which alloy has a melting point lower than that of the metal to be extruded, and means supplying said molten alloy to said duct from said alloy source.

19. The apparatus of claim 14, and wherein one of the opposed molten metal-contacting surfaces of one of said ring and core members has an annular duct therein, a source of molten alloy which alloy has a melting point lower than that of the metal to be extruded, means supplying said molten alloy to said duct from said alloy source, said duct being located at a point remote from said nozzle outlet end, a molten alloy outlet from said ring and core member-provided space and adjacent said nozzle outlet end, and a return passage-providing connection between said molten alloy outlet and its source.

20. The apparatus of claim 14, and wherein one of the opposed molten metal-contacting surfaces of one of said ring and core members has an annular duct therein, a source of molten alloy which alloy has a melting point lower than that of the metal to be extruded, means supplying said molten alloy to said duct from said alloy source, said duct being located at a point remote from said nozzle outlet end, a molten alloy outlet from said ring and core member-provided space and adjacent said nozzle outlet end, a return passage-providing connection between said molten alloy outlet and its source, and wherein said cooling means comprises a cooling medium chamber provided by said ring member.

21. The apparatus of claim 14, and wherein one of the opposed molten metal-contacting surfaces of one of said ring and core members has an annular duct therein, a source of molten alloy which alloy has a melting point lower than that of the metal to be extruded, means supplying said molten alloy to said duct from said alloy source, said duct being located at a point remote from said nozzle outlet end, a molten alloy outlet from said ring and core member-provided space and adjacent said nozzle outlet end, a return passage-providing connection between said molten alloy outlet and its source, and wherein a second cooling means is provided which comprises a chambered cooling medium-receiving member discharging its cooling medium against the extruded sheath outwardly of the discharge end of said nozzle.

References Cited in the file of this patent
UNITED STATES PATENTS

| | | |
|---|---|---|
| 1,866,145 | Wilson | July 5, 1932 |
| 2,214,016 | Duclos | Sept. 10, 1940 |
| 2,765,527 | Fairfield et al. | Oct. 9, 1956 |
| 2,790,412 | Knapp et al. | Apr. 30, 1957 |